United States Patent
Atkinson et al.

(10) Patent No.: US 10,503,231 B2
(45) Date of Patent: Dec. 10, 2019

(54) LOAD LINE REGULATION VIA CLAMPING VOLTAGE

(71) Applicant: Microsoft Technology Licensing, LLC, Redmond, WA (US)

(72) Inventors: Peter Atkinson, Sammamish, WA (US); Steven William Ranta, Seattle, WA (US); Francine Mary Shammami, Seattle, WA (US); William Paul Hovis, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 61 days.

(21) Appl. No.: 15/841,201

(22) Filed: Dec. 13, 2017

(65) Prior Publication Data

US 2019/0050039 A1    Feb. 14, 2019

Related U.S. Application Data

(60) Provisional application No. 62/543,938, filed on Aug. 10, 2017.

(51) Int. Cl.
*G06F 1/00* (2006.01)
*G06F 11/30* (2006.01)
(Continued)

(52) U.S. Cl.
CPC ............. *G06F 1/28* (2013.01); *G05F 1/462* (2013.01); *G05F 1/468* (2013.01); *G06F 1/26* (2013.01)

(58) Field of Classification Search
CPC ........................................... G06F 1/26
See application file for complete search history.

(56) References Cited

U.S. PATENT DOCUMENTS 6,472,899 B2    10/2002    Osburn et al.
7,642,764 B2     1/2010    Burton et al.
(Continued)

OTHER PUBLICATIONS

"Introducing Richtek VCORE Solutions", Retrieved From <<http://www.richtek.com/en/About Richtek/Newsletters/NewsLetterPreview?previewitemid=%7b07DB4560-CF1A-465F-9908-A376AAD24A40%7d>>, Retrieved on: Oct. 3, 2017, 3 Pages.
(Continued)

*Primary Examiner* — Mohammed H Rehman
(74) *Attorney, Agent, or Firm* — Alleman Hall Creasman & Tuttle LLP (57) ABSTRACT

A computing device is provided that includes a processor, a primary power supply, and a voltage regulation module. The voltage regulation module is configured to determine a load line for the processor and monitor a voltage and a current to the processor. While monitoring the voltage and current, the voltage regulation module is further configured to regulate the voltage to the processor to trend toward a voltage setpoint defined by the load line. While regulating the voltage, the voltage regulation module is further configured to clamp the load line at a clamping voltage to limit the regulated voltage output by the voltage regulation module from falling below a predetermined device minimum operation voltage when the monitored current exceeds a device maximum current value. The voltage regulation module is further configured to output electrical power at the regulated voltage to the processor.

20 Claims, 7 Drawing Sheets

(51) Int. Cl.
    *G06F 1/28* (2006.01)
    *G05F 1/46* (2006.01)
    *G06F 1/26* (2006.01)

(56) References Cited

U.S. PATENT DOCUMENTS

| | | |
|---|---|---|
| 8,510,582 B2 | 8/2013 | Naffziger et al. |
| 8,621,246 B2 | 12/2013 | Ravichandran et al. |
| 9,148,056 B2 | 9/2015 | Zanetta et al. |
| 2002/0125871 A1 | 9/2002 | Groom et al. |
| 2003/0137787 A1 | 7/2003 | Kumar et al. |
| 2007/0271473 A1 | 11/2007 | Hosomi |
| 2009/0077402 A1 | 3/2009 | Huang et al. |
| 2012/0242376 A1* | 9/2012 | Ose .................. H03K 17/0828 327/109 |
| 2015/0102791 A1 | 4/2015 | Haider et al. |
| 2015/0131188 A1* | 5/2015 | Yao ........................ H03F 1/52 361/87 |
| 2015/0146332 A1* | 5/2015 | Seberger ................ H02H 9/02 361/57 |
| 2017/0012545 A1* | 1/2017 | Wang .................... H02M 1/32 |
| 2017/0179820 A1* | 6/2017 | Zhang .................... H02M 3/00 |
| 2017/0255251 A1 | 9/2017 | Zhang et al. |
| 2018/0284830 A1* | 10/2018 | Yung ....................... G05F 1/66 |

OTHER PUBLICATIONS

"International Search Report and Written Opinion Issued in PCT Application No. PCT/US2018/038655", dated Aug. 13, 2018, 11 Pages.

* cited by examiner

LOAD LINE REGULATION VIA CLAMPING VOLTAGE

CROSS REFERENCE TO RELATED APPLICATIONS

This application claims priority to U.S. Provisional Patent Application Ser. No. 62/543,938 filed Aug. 10, 2017, the entirety of which are hereby incorporated herein by reference for all purposes.

BACKGROUND

Voltage regulation modules are used in computing devices to convert supply voltage to a lower voltage that is used by a processor such as a central processing unit, graphics processing unit, or system on chip. In voltage regulation modules for nonlinear circuits, a load line is used to define a relationship between current and voltage such that the supply voltage can be regulated in response to current demand. Load line regulation has been used to match power system delivery characteristics to the load such that voltages at the load stay within certain minimum and maximum voltages at all times of load operation.

SUMMARY

To address the issue of load line regulation, a computing device is provided that includes a processor, a primary power supply, and a voltage regulation module. The voltage regulation module is configured to receive electrical power from the primary power supply, determine a load line for an electrical load of the processor, and monitor a voltage and a current to the processor via respective voltage and current sensing loops. While monitoring the voltage and current, the voltage regulation module is further configured to regulate the voltage to the processor to trend toward a voltage setpoint defined by the load line for the monitored current. While regulating the voltage, the voltage regulation module is further configured to clamp the load line at a clamping voltage to limit the regulated voltage output by the voltage regulation module from falling below a predetermined device minimum operation voltage when the monitored current exceeds a device maximum current value. The voltage regulation module is further configured to output electrical power at the regulated voltage to the processor.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The inventors have recognized a drawback with prior load line regulation systems in that improper setting of the voltage identification or load line function can cause the voltage regulation module to produce an output voltage that falls below a minimum value for proper operation of the electronic device. To address this drawback, the inventors have conceived of a system that limits the voltage that the load line can command the voltage regulation module to output. This system can inhibit a device from operating at a voltage below a minimum operating value even if the device attempts to draw a high current, as described below.

Since many power regulation systems are now providing programmable load lines implemented via digital components, the inventors have recognized that it is possible to create a new function, via register commands, that programs the point at which the load regulation terminates (or limits), and this function can be applied either universally across all devices employing the power regulation system or independently learned on a device-by-device basis. In practice, current demand from a device, such as a central processing unit, a graphics processing unit, or system on chip, is a function of how much circuitry is already active within that device. As the device approaches its maximum current demand, there is a significantly smaller additional load that could be experienced, which reduces the need for continuing down a load line at that point. There is often a difference in the maximum load between a realistic application and many test applications that are programmed like a so-called power virus, which is a type of program designed to produce a maximum power demand but not necessarily for useful or realistic operation of the device, and which can produce such a high current demand that the voltage is drawn below the device minimum operation voltage, potentially causing malfunctions. Clamping the load line at a minimum operating voltage that is a safe voltage value, above the minimum voltage achievable by a power virus driving the system to malfunction, can prevent the voltage at the device from going below a device minimum operation voltage at high current demands, thereby enhancing system performance and/or reducing the system power. This solution avoids the situation discussed above when, at a given high current performance level such as under power virus maximum current demand, the system runs at a lower voltage than the device minimum operation voltage.

Figure 1:
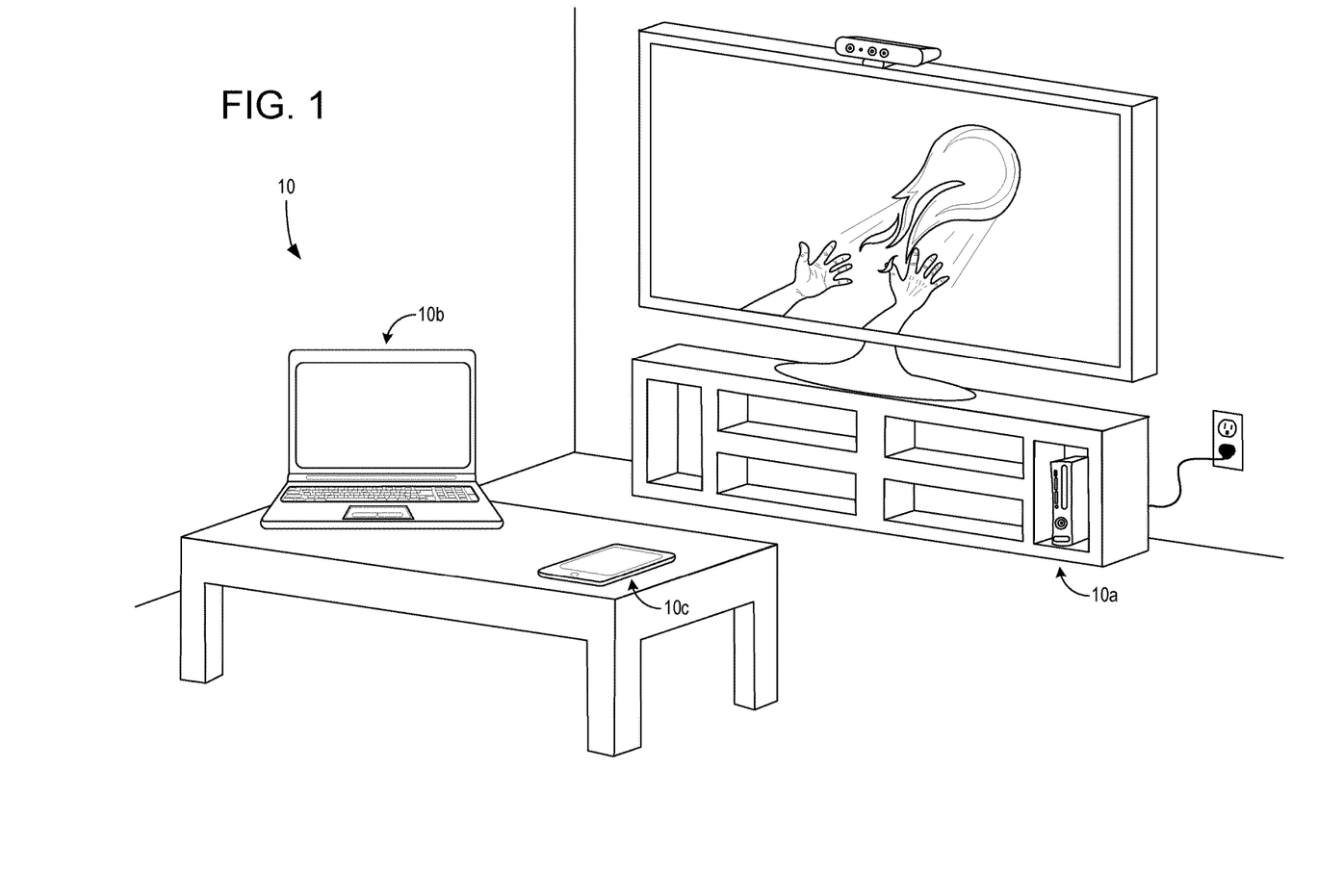
FIG. 1 is an example living environment with example implementations of computing devices configured as a game console, a personal computer, and a mobile phone.

FIG. 1 illustrates an example living environment with example implementations of computing devices 10 as a game console 10a, a personal computer 10b, and a mobile phone 10c. As shown, the game console 10a may be powered by direct connection to a power grid via a wall outlet, while the personal computer 10b and the mobile phone 10c may include rechargeable batteries that store energy in chemical form that can be converted to electrical energy. Regardless of the type of power supply, each of these implementations requires regulation of the power supply to satisfy the current demand of various components of the device without the voltage falling below a minimum value at which the device fails to operate properly.

Figure 2:
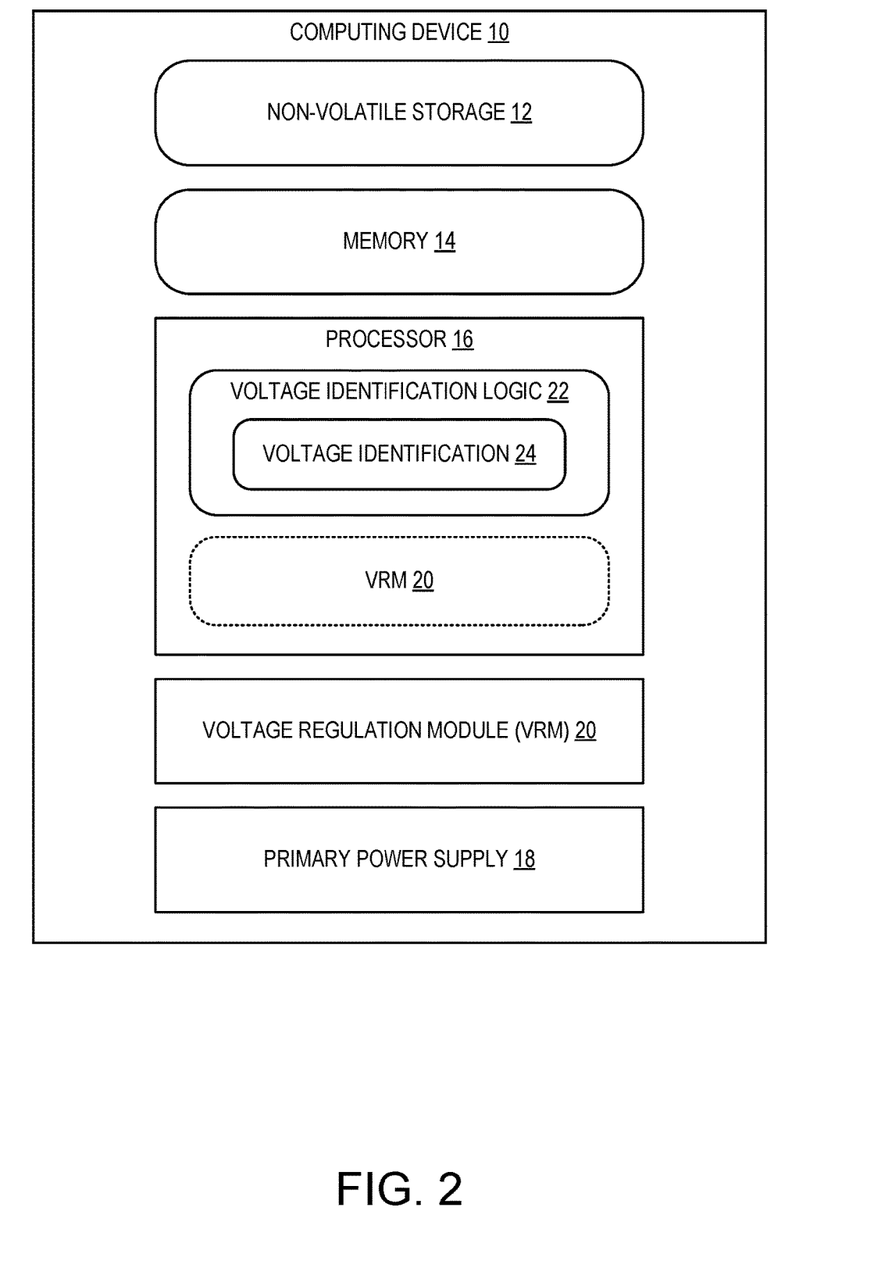
FIG. 2 is a block diagram of a configuration of a computing device which, for example, may take the form of one of the computing devices illustrated in FIG. 1.
Figure 4:
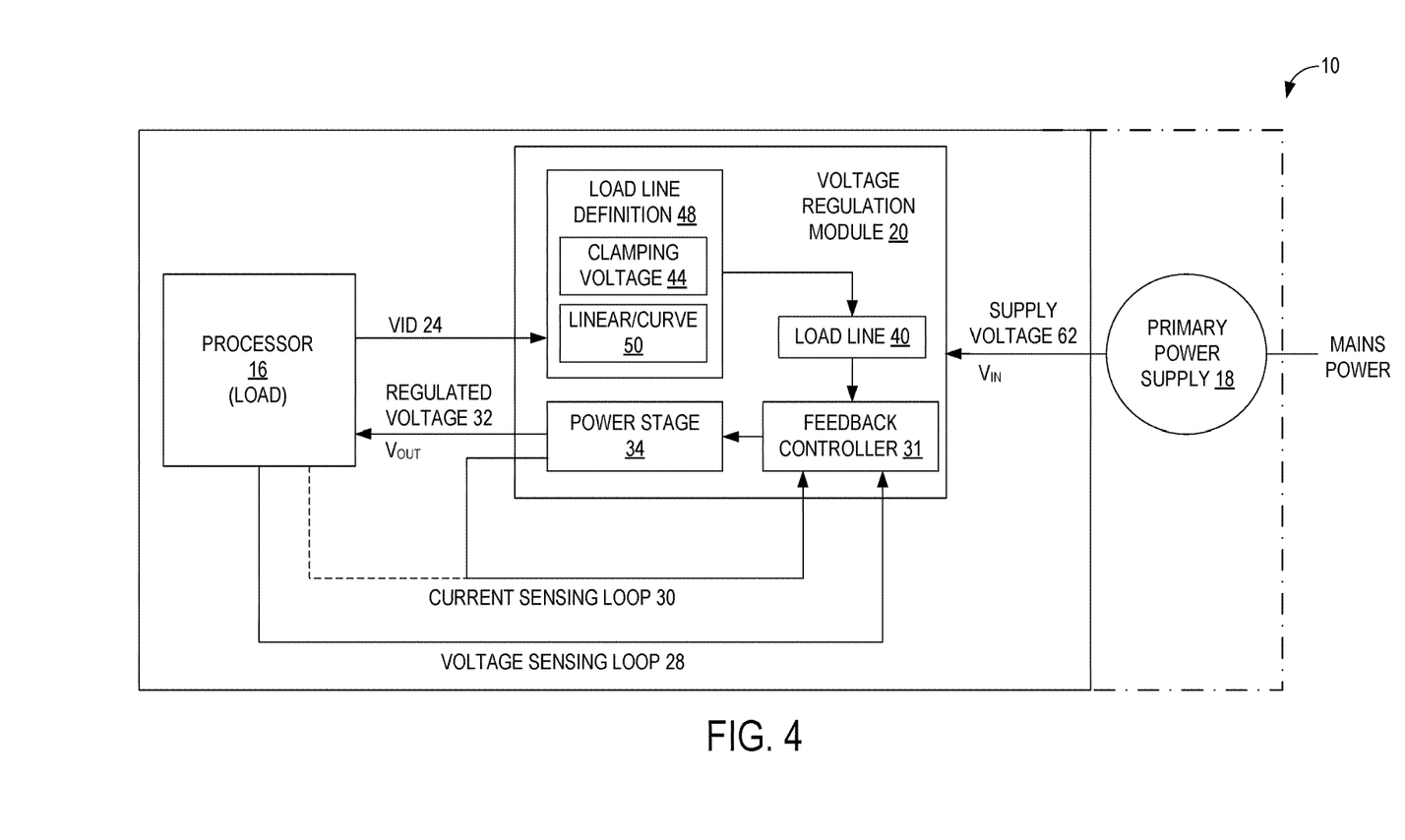
FIG. 4 is a schematic view of the voltage regulation module of FIG. 3 in communication with a processor and a power supply.

As shown in FIG. 2, to address the above identified issues, a computing device 10 is provided. The computing device 10 includes non-volatile storage 12, memory 14, a processor 16, a primary power supply 18, and a voltage regulation module (VRM) 20 in communication with the processor 16 and the primary power supply 18. The VRM 20 is configured to receive electrical power ($V_{IN}$) from the primary power supply 18, and using feedback control described below, output electrical power at a regulated voltage to the processor 16. In some implementations, the VRM 20 may be included in the processor 16, as indicated by the dashed lines. The processor 16, which may be configured as a central processing unit, a microprocessor, and/or a system on chip (SoC), includes a voltage identification logic 22 that communicates a voltage identification (VID) 24 to the VRM 20, and the VID 24 may define an initial voltage setpoint, which is a maximum voltage at no load. The primary power supply 18 may be configured to supply a regulated current to the VRM 20 of computing device 10. The primary power supply 18 may in turn be electrically connected to mains power, in some examples, as shown in FIG. 4.

Figure 3:
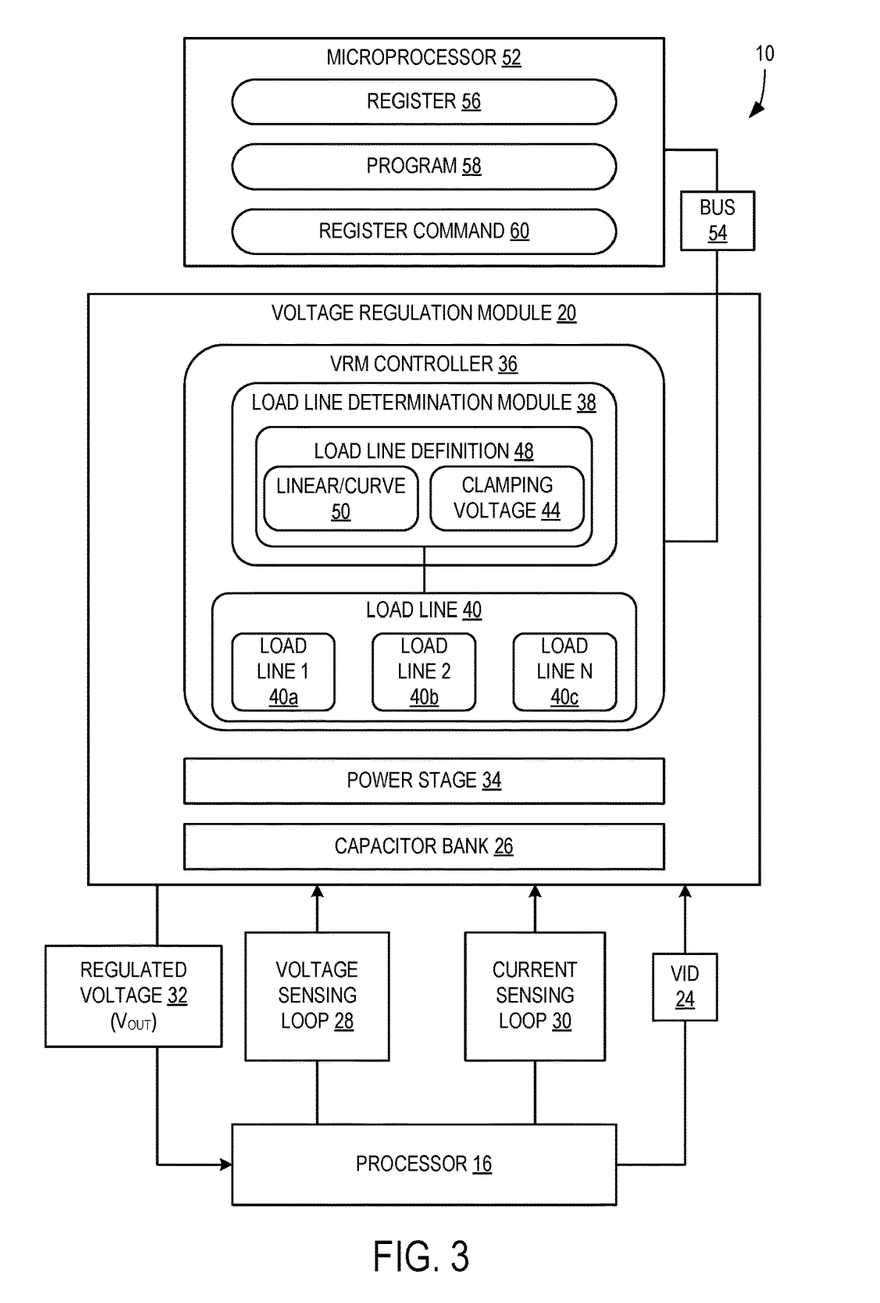
FIG. 3 is a block diagram of a voltage regulation module of the computing device of FIG. 2.

Turning to FIG. 3, details of VRM 20 of FIG. 2 are illustrated in a block diagram. VRM 20 communicates with the processor 16, and may be configured to monitor the voltage and current of the processor 16 via a voltage sensing loop 28 and a current sensing loop 30, respectively, receive a VID 24 to establish an initial voltage setpoint, and regulate a voltage of the primary power supply 18 (see FIG. 1) to output a specific regulated voltage ($V_{OUT}$) 32 to the processor 16. Typically, the VRM 20 includes one or more capacitors, depicted in FIG. 3 as a capacitor bank 26, that may be used to store charge from the primary power supply 18 in the form of electrical energy. A power stage 34 in the VRM 20 performs the basic power conversion from $V_{IN}$ to $V_{OUT}$ and may include switches and an output filter.

Figure 5:
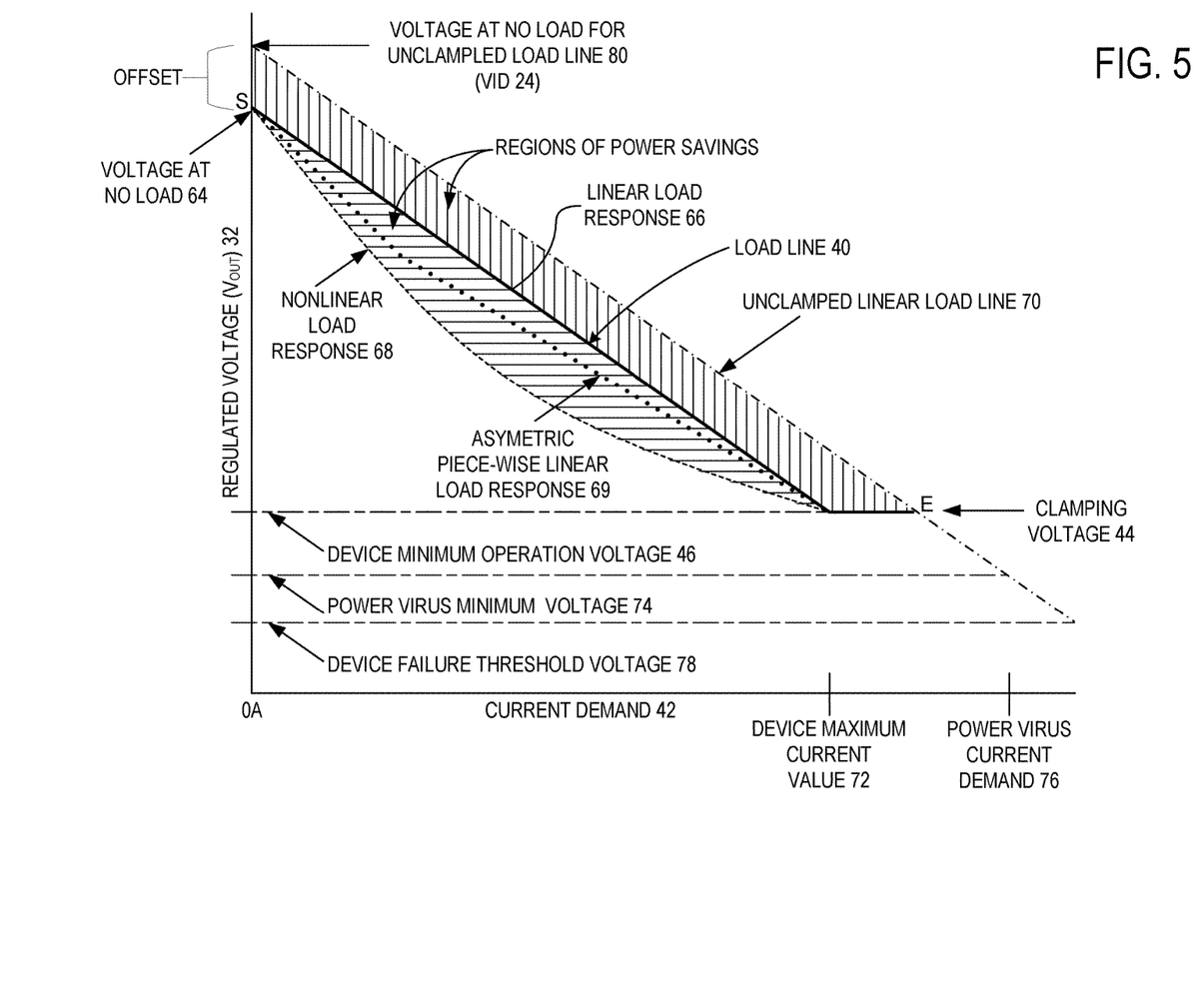
FIG. 5 is a line graph of a load line showing the relationship between supply voltage and current demand in the voltage regulation module of FIG. 3.

With continued reference to FIG. 3, the VRM 20 may include VRM controller 36, which may hold data and programs to execute the functions of the VRM 20 describe herein. VRM controller 36 stores a load line determination module 38 that is configured to determine a load line 40 for an electrical load of the processor 16. The load line 40 defines a functional relationship between a voltage setpoint and a monitored load current of the processor 16. An example load line is illustrated in FIG. 5.

Continuing with FIG. 3, the VRM 20 may be configured to store a load line definition 48 defining one or more load lines 40 in VRM controller 36. The load line definition 48 included in the load line determination module 38 may define a value of a clamping voltage 44 and a linear, piece-wise linear, or curved relationship 50 of the load line 40, for example. The clamping voltage 44 is a voltage at which the VRM 20 may limit the regulated voltage 32 output by the VRM 20 to the processor 16 from falling below a predetermined threshold, as discussed in detail below in relation to FIG. 5. It will be appreciated that the predetermined threshold may be a device minimum operation voltage 46 that is within a range of safe voltage values in which the device is fully functional, and can be contrasted with the value of the device failure threshold voltage 78 at which the device fails. In some implementations, the load line definition 48 may define preset values of one or more load lines 40 configured to be stored in the VRM controller 36, as indicated in FIG. 3 by load line 1 (40a), load line 2 (40b), and load line n (40c). While three load lines 40a, 40b, 40c are illustrated in the example implementation, it will be appreciated that any number of load lines 40 may be stored in the VRM controller 36. One concrete example of a load line 40 is illustrated in detail in FIG. 5.

A microprocessor 52 may be in communication with the VRM controller 36 via a data bus 54. The load line determination module 38 is typically a software program that is executed by the microprocessor 52 using portions of the VRM controller 36. Other functions of the VRM 20 described herein are similarly implemented by the microprocessor 52.

To enable the load line functionality to be programmable by developers and accessible by operating systems and other programs executed on the computing device 10, the microprocessor 52 may include a register 56 and a register accessing program 58. The register 56 may be configured to store directions that access the load line determination module 38 and/or load line definition 48 when prompted by a command from the program 58. As discussed above, the load line definition 48 may include a value of a clamping voltage 44 and a shape of a curve 50 of the load line 40, as well as preset values for a load line 40 that may be stored in the VRM controller 36. As such, the VRM 20 may be programmed to set and/or change the value of the clamping voltage 44 via a register command 60 received at the microprocessor 52 that directs the register 56 to access the load line determination module 38 and/or load line definition 48 via the data bus 54.

Turning to FIG. 4, a view of the feedback loops for sensing current and voltage are shown in detail. As illustrated, a supply voltage 62 ($V_{IN}$) is delivered to the VRM 20 by the primary power supply 18, and the VRM 20 outputs a regulated voltage 32 ($V_{OUT}$) to the processor 16. As discussed above, the VRM 20 monitors the voltage and current of the processor 16 via the voltage sensing loop 28 and the current sensing loop 30, which are in communication with a feedback controller 31 in the VRM 20. The feedback controller 31 receives and processes data from the voltage sensing loop 28 and the current sensing loop 30, and communicates real-time voltage data to the power stage 34. While the current sensing loop 30 can originate from the processor 16, as indicated by the dashed line in FIG. 4, the feedback loop function is typically implemented within the VRM 20, for example by sensing the current from the power stage 34, as indicated by the solid line.

While monitoring the voltage and current, the VRM 20 is further configured to regulate the voltage to the processor 16 to trend toward a voltage setpoint defined by the load line 40 for the monitored current. While regulating the voltage, the VRM 20 is further configured to clamp the load line 40 at a clamping voltage 44 to limit the regulated voltage output by the VRM 20 from falling below a predetermined device minimum operation voltage (see 46 in FIG. 5) when the monitored current exceeds a device maximum current value (see 72 in FIG. 5). In this manner, feedback control of the voltage setpoint for the regulated voltage 32 may be implemented.

Referring next to FIG. 5, a line graph of the load line 40 showing the relationship between regulated voltage 32 and current demand 42 according to the VRM 20 of FIG. 3 is shown. It will be appreciated that this line graph is provided as an exemplary implementation of a load line 40 showing the relationship between regulated voltage 32 and current demand 42. The X axis indicates the current demand 42, and the Y axis indicates the regulated voltage 32. The depicted load line 40 is shown in bold and extends from a starting point S at a no load voltage 64 ($V_{MAX}$) to an endpoint E at a clamping voltage 44 that corresponds to a monitored current that is measured to be greater than a device maximum current value 72. This clamping voltage 44 is typically set to the predetermined device minimum operation voltage 46, but may be set higher.

It will be appreciated that with the programmable features of VRM 20, the load line 40 between the maximum voltage value ($V_{MAX}$) 64 and the clamping voltage 44 at the predetermined device minimum operation voltage 46 may be defined as either a linear load response 66 (depicted by the solid line) or a nonlinear load response 68 (depicted by the dashed line).

Several approaches may be used to compute the voltage at no load 64 ($V_{MAX}$) for the clamped load line 40. For example, as discussed above, the processor 16, which is causing the electrical load, may include voltage identification logic 22 configured to communicate a VID 24 to the VRM 20, and the VRM may be configured to determine the maximum voltage setpoint for the maximum voltage value ($V_{MAX}$) 64 based upon the VID 24. The maximum voltage value may be computed, for example, by substracting an offset from the VID 24 value. Alternatively, the VID value itself may be used. In other examples, the voltage at no load 64 ($V_{MAX}$) may be determined by machine learning. The machine learning, for example, may utilize a variety of test programs that simulate varying electrical loads of the processor, such as a simulated power virus current demand 76, etc. Under these varying test conditions, a plurality of possible $V_{MAX}$ values may be tested and evaluated for their simulated performance. Monte Carlo methods may be used, so that randomness in simulated performance may be introduced to solve for an optimal $V_{MAX}$ value. Additional description of machine learning techniques is provided below.

As discussed above, the VRM 20 may be programmable, and it may specify a value of the clamping voltage 44 to such that the load line 40 is flattened (clamped) at a point at which the load line impedance approaches a value of 0. Thus, the VRM 20 may set the value of the clamping voltage 44 and/or a slope of the load line 40 such that the voltage droop along a load line 40 is limited. Without clamping the load line 40, the value of the regulated voltage 32 may drop below the device minimum operation voltage 46, as shown by the dash-dot line in FIG. 5, which indicates a conventional unclamped linear load line 70 that extends beyond the device minimum operation voltage 46 and the device maximum current value 72. As the regulated voltage 32 approaches a voltage level of a power virus minimum voltage 74 to fulfill a power virus current demand 76, the computing device 10 may experience low voltage situations that result undesirable events such as brownouts and/or system glitches or crashes. Proceeding further down the load line 40 could result in the voltage reaching a device failure threshold voltage 78, which could result in system failure.

In a typical implementation, the clamping voltage 44 on the load line 40 may be at or near a value of the device minimum operation voltage 46. As discussed above, if the voltage setpoint value is lower than the device minimum operation voltage 46, the value of the clamping voltage 44 on the load line 40 may be set to be equal to a value of the device minimum operation voltage 46 to prevent the regulated voltage 32 from reaching the value of the device failure threshold voltage 78. Alternatively, the clamping voltage 44 may be set from the perspective of current such that a value of the clamping voltage 44 is at a point on the load line 40 at or near a realistic device maximum current value 72 under normal system operation conditions.

The embodiments described herein may provide several potential benefits. For example, clamping the load line 40 at the clamping voltage 44 at or near the device minimum operation voltage in this manner 46 prevents the value of the regulated voltage 32 from reaching such values, and thus prevents the device from failing or causing glitches such as computational errors that can occur if the device exceeds the maximum CPU power dissipation. Clamping the load line 40 to cap the value of the regulated voltage 32 may also allow the device 10 to consume less power without compromising the overall performance level of the device 10 and/or system. For example, as shown in FIG. 5, the $V_{MAX}$ 64 of a device 10 with a clamped linear load response 66 may be set by the VRM 20 to be lower than a $V_{MAX}$/VID 80/24 for an unclamped linear load response 70. Setting a lower $V_{MAX}$ 64 provides reduced linear load response and an improved minimum voltage value in comparison to conventional load lines. This improved minimum voltage can result in enhanced system performance in which the device 10 runs at a higher clock speed and/or reduced system power because, at a given performance level, the device 10 can run at a lower average voltage value. The power savings realized by the example load line 40 of FIG. 5 are shown in cross hatching. Vertical hatching shows the power savings that may be realized by operating a clamped load line with $V_{MAX}$ at no load set lower than the VID 24 value. Further, horizontal hatching represents power savings that may be realized by operating with a load line having a nonlinear load response 68, as shown in FIG. 5. Similarly, the asymmetric piece-wise linear load response 69 also provides power savings compared to the conventional linear load line 40, although typically a smaller savings than is achieved with following the nonlinear load response 68.

In any of the implementations described herein, the programmability of the VRM 20 is such that a relatively fine granularity may be achieved. In scenarios in which the load line 40 is not linear, the VRM 20 can be programmed in accordance with the characteristics of the curve 50 and/or a piece-wise linear approach that approximates the curve 50. The curve may also be symmetric or asymmetric between its endpoints. An example of an asymmetric piece-wise response curve 69 is shown in FIG. 5 by a dotted line. As such, the programmable VRM 20 can support multiple power states of various systems, including computing devices 10 configured as game consoles 10a, personal computers 10b, and mobile phones 10c, as illustrated in FIG. 1, as well as servers and other portable electronic devices, for example.

Since the value of the clamping voltage 44 may be programmed, it may be set consistently from system to system, or it may be set deterministically based upon the VID 24 being used, or it could also be programmed independently within each system based upon a machine learning technique. Similarly, the value of the $V_{MAX}$ 64 can be set consistently, deterministically, or independently in accordance with the value of the clamping voltage 44. The concept of machine learning in this context reflects the variable nature of the maximum current load in the system, which depends upon the attributes of the device creating the demand, as well as a consistent program operating at a consistent performance level.

With such a programmable VRM 20, each power state that a computing device 10 or system uses can be independently programmed via functional modes within system SoCs, processors, or other devices that allow for the setting of different load slopes and values of clamping voltage 44. For example, the VRM 20 can set and/or store one or more programmable values of the load line definition 48 (e.g., slope and clamping voltage 44 value) that are either predetermined or learned on a system by system basis, with at least one set of values for the highest power state being required. It should be noted that supporting multiple states would require multiple sets of values. The VRM 20 may also set the values in accordance with a learning process whereby the load line 40 slope and clamping voltage 44 value can be determined by design and/or a testing process. In this scenario, the testing process can be used to confirm the appropriate response to prevent voltage undershoot for realistic load demands without supplying a load line 40 value that is overly steep. Such a programmable VRM 20 has a potential benefit in that the tuning of the values can be adjusted as a result of capacitive aging over time if load delivery characteristics change as a result of such aging.

Capping or clamping the voltage reduction reflects providing a realistic limit within each system that supports normal operation. As discussed above, there are often test applications that produce power virus like characteristics which can produce high current demand beyond normal operation (i.e., which are designed to stress the limits of system operation). With the implementation of a programmable VRM 20, programs that exceed the device maximum current value 72 would be constrained so that further voltage degradation would not occur, and with this operation performance of the device 10 being supplied would not be compromised (or required to run at a lower frequency).

In classical terms, a linear load response 66 would be a desired implementation as a current demand 42 would be consistent at any point along the load line 40. The SoC, processor, or other devices can have very large sudden increases in current when operating near the initial VID 24 of the load line 40; however, load demand for further increases in current that would take it farther down the load line 40 diminish when the device 10 is already operating at high output current. Thus, it would be beneficial to have a load line 40 as described herein that reduces regulated voltage 32 more aggressively to handle relatively high transient loads, but that is clamped at a predetermined or programmatically determined point so that larger sustained loads don't result in a regulated voltage 32 below the device minimum operating voltage 46 according to an unclamped load line 40 function. This phenomenon is due to decreases in the amount of current necessary for switching capacitors (following a curve defined by capacitance times voltage raised to the 2.5 power, as a result of switching and shoot through current) and due to decreases in leakage power (decreasing here on an exponential basis). By following a nonlinear load response 68 as shown by the dashed line in FIG. 5, overall power will be reduced since the device can operate at a lower average voltage level, and thus a lower average power level, as compared to the conventional load line 40. Knowing, or learning, the minimum voltage achieved at the realistic device maximum current value 72 can help set the shape of the curve or piece-wise linear approximation of the curve. This information may be entered by any number of mathematical methods with the VRM 20, for example, either hard coding one or several options to represent a curve characteristic or a piece-wise linear approximation. It will be appreciated that the graph in FIG. 5 depicts an exemplary scenario, and it is intended for illustrative purposes. Other concepts, such as throttling mechanisms within the SoC, processor, or other devices, may be used in conjunction with the programmable VRM 20 to make the use of a nonlinear load response 68 advantageous. Such items cap or limit the further expenditure of power (and current) when a threshold of activity has been reached. Although some may operate on long term averages, others may react based on short bursts of activity.

In an example scenario according to the graph in FIG. 5, the maximum voltage value ($V_{MAX}$) 64 at which there is no load may be in a range of 0.7 volts to 1.3 volts, and in one example has a value of 1.05 volts. The device minimum operation voltage 46 may be in a range from 0.55 volts to 1.2 volts, and in one example has a value of 0.9 volts. To prevent the value of the regulated voltage 32 from falling below the device minimum operation, the VRM 20 may set a value of the clamping voltage 44 to be within a range of 0.6 volts to, 1.25 volts, and in one example at a value of 0.95 volts. It will be appreciated that the voltage values provided herein are exemplary of one implementation of the VRM 20 in a computing device and are not meant to describe or suggest voltage values for all devices and/or systems in which the VRM 20 may be implemented. As such, these values represent system requirements of leading edge processors, graphics chips, and/or SoC designs at the time of this application and may change as technologies evolve.

When implemented, a programmable VRM 20 such as the one described in this application has numerous benefits such as saving system power, reducing the size and cost of a voltage filtering network, and avoiding low voltage situations that result in brownouts and/or system glitches or crashes.

Figure 6:
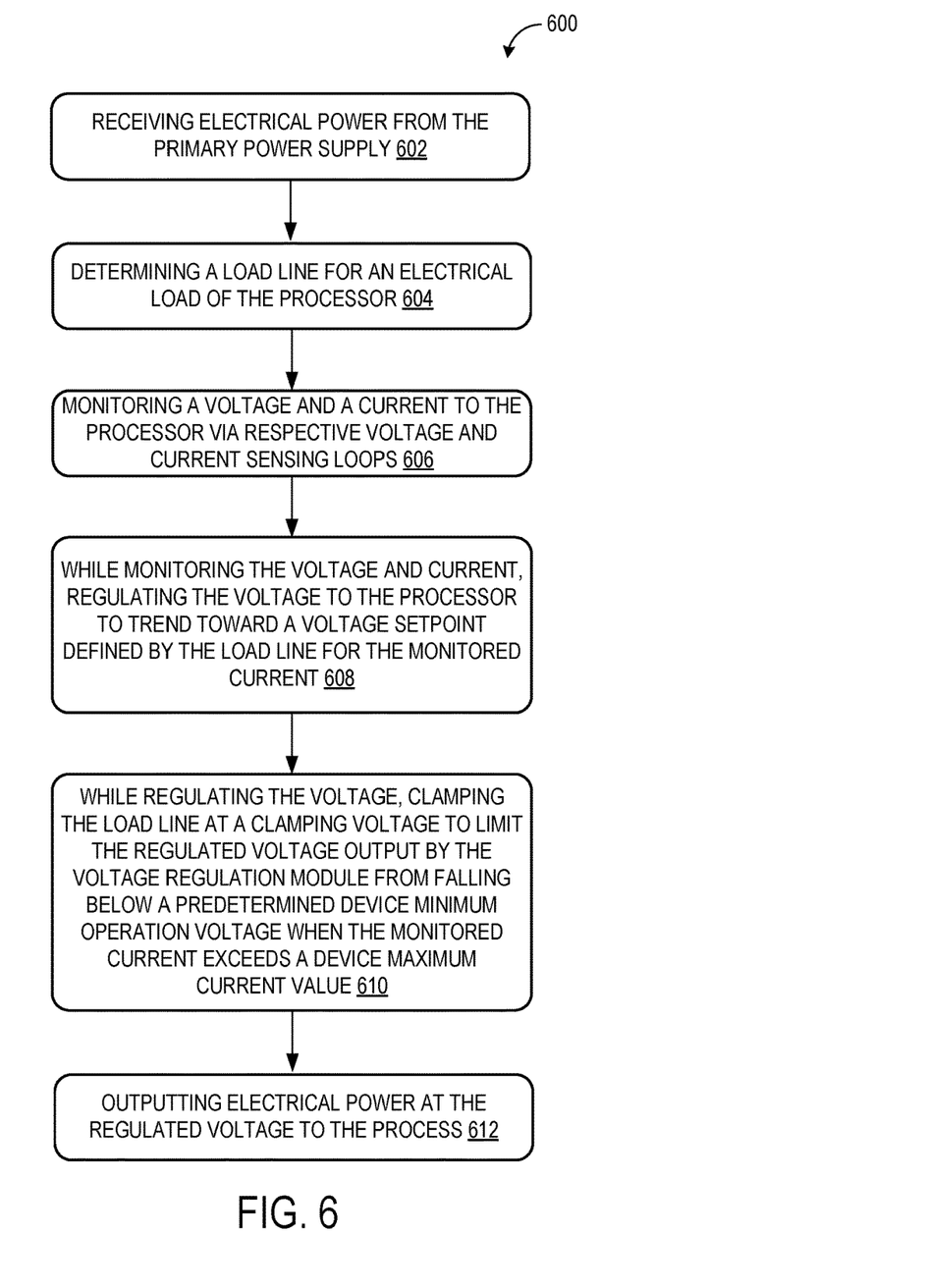
FIG. 6 is a flowchart of a method for regulating voltage in a computing device, according to one implementation of the present disclosure.

Turning to FIG. 6, an example method 600 for a computing device comprising a processor, a primary power supply, and a voltage regulation module is illustrated. As described above, any implementation of the method 600 may include configuring the computing device as a game console, personal computer, server, or portable electronic device.

At step 602, the method may comprise, at the voltage regulation module, receiving electrical power from the primary power supply. As described above, the primary power supply may be housed inside the computing device, or it may be configured as an external transformer.

Continuing to step 604, the method may further comprise determining a load line for an electrical load of the processor. As discussed above, the load line defines a functional relationship between a voltage setpoint and a monitored load current from a maximum voltage at no load to a maximum load current value.

Advancing to step 606, the method may further comprise monitoring a voltage and a current to the processor via respective voltage and current sensing loops. At step 608, the method may further comprise, while monitoring the voltage and current, regulating the voltage to the processor to trend toward a voltage setpoint defined by the load line for the monitored current.

Continuing to step 610, the method may further comprise, while regulating the voltage, clamping the load line at a clamping voltage to limit the regulated voltage output by the voltage regulation module from falling below a predetermined device minimum operation voltage when the monitored current exceeds a device maximum current value. As discussed above, the value of the clamping voltage may be set to be equal to a constant voltage value at a device maximum current value. In some implementations, the VRM may evaluate the voltage setpoint as a function of the load line at the value of the monitored current. If the function returns a voltage setpoint value lower than the device minimum operation voltage, the value of the clamping voltage may be set to be equal to the device minimum operation voltage.

As discussed above, in some implementations, the device may include a voltage identification logic that provides a predetermined VID as an initial setpoint for the load line. In these implementations, the method may include communicating a VID from the voltage identification logic of the processor to the VRM, and determining the maximum voltage setpoint based upon the VID. The method may include computing the maximum voltage value by substracting an offset from the VID value or by machine learning.

Advancing to step 612, the method may further comprise outputting electrical power at the regulated voltage to the processor.

In any implementation of method 600, the VRM may be programmable to set and/or change a value of the clamping voltage on the load line via a register command, as detailed above. The VRM may be further configured to set a value of the slope of the load line. Accordingly, the method 600 may include defining the load line between a maximum voltage value at which there is no load and a minimum voltage value equal to the predetermined device minimum operation voltage as a linear load response. Alternatively, the method 600 may include defining the load line between a maximum voltage value at which there is no load and a minimum voltage value equal to the predetermined device minimum operation voltage as a nonlinear load response.

It will be appreciated that the method steps described above may be performed using the algorithmic processes described throughout this disclosure, including in the description of the computing device 10 above.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
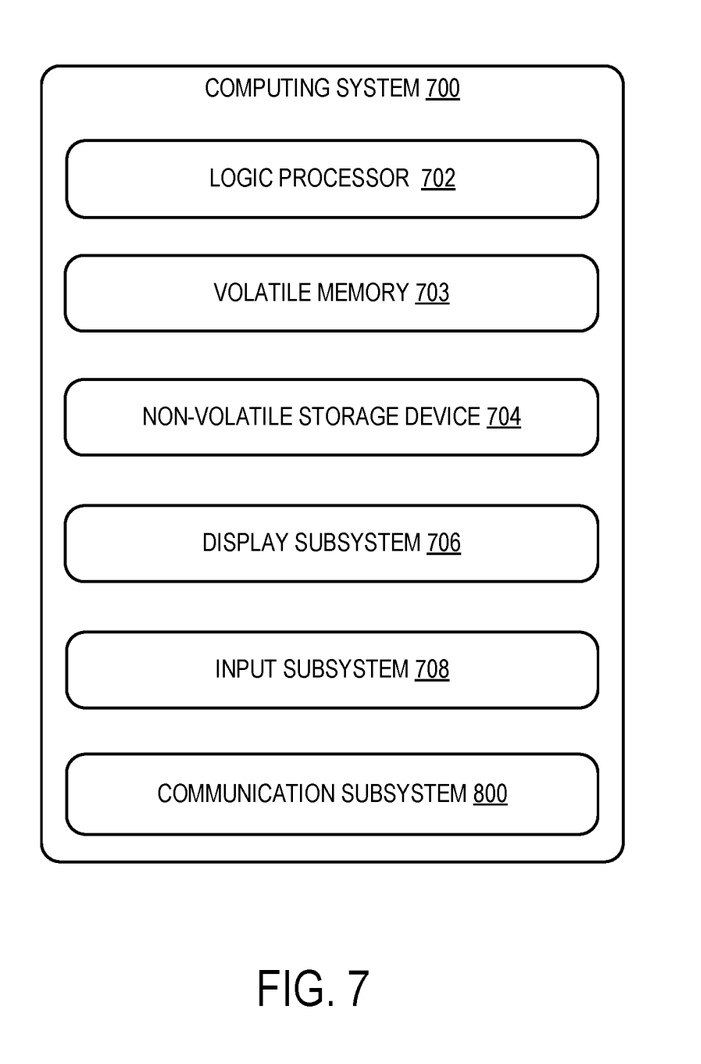
FIG. 7 is an example computing system, which may be used as the computing device of FIG. 2.

FIG. 7 schematically shows a non-limiting embodiment of a computing system 700 that can enact one or more of the methods and processes described above. Computing system 700 is shown in simplified form. Computing system 700 may embody the computing device, for example. Computing system 700 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 700 includes a logic processor 702 volatile memory 703, and a non-volatile storage device 704. Computing system 700 may optionally include a display subsystem 706, input subsystem 708, communication subsystem 800, and/or other components not shown in FIG. 7.

Logic processor 702 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 702 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 704 includes one or more physical devices configured to hold instructions executable by the logic processors to implement the methods and processes described herein. When such methods and processes are implemented, the state of non-volatile storage device 704 may be transformed—e.g., to hold different data.

Non-volatile storage device 704 may include physical devices that are removable and/or built-in. Non-volatile storage device 704 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 704 may include nonvolatile, dynamic, static, read/write, read-only, sequential-access, location-addressable, file-addressable, and/or content-addressable devices. It will be appreciated that non-volatile storage device 704 is configured to hold instructions even when power is cut to the non-volatile storage device 704.

Volatile memory 703 may include physical devices that include random access memory. It will be appreciated that random access memory may also be provided in non-volatile memory. Volatile memory 703 is typically utilized by logic processor 702 to temporarily store information during processing of software instructions. It will be appreciated that volatile memory 703 typically does not continue to store instructions when power is cut to the volatile memory 703.

Aspects of logic processor 702, volatile memory 703, and non-volatile storage device 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 typically implemented in software by a processor to perform a particular function using portions of volatile memory, which function involves transformative processing that specially configures the processor to perform the function. Thus, a module, program, or engine may be instantiated via logic processor 702 executing instructions held by non-volatile storage device 704, using portions of volatile memory 703. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc.

The terms "module," "program," and "engine" may encompass individual or groups of executable files, data files, libraries, drivers, scripts, database records, etc.

When included, display subsystem 706 may be used to present a visual representation of data held by non-volatile storage device 704. The visual representation may take the form of a graphical user interface (GUI). As the herein described methods and processes change the data held by the non-volatile storage device, and thus transform the state of the non-volatile storage device, the state of display subsystem 706 may likewise be transformed to visually represent changes in the underlying data. Display subsystem 706 may include one or more display devices utilizing virtually any type of technology. Such display devices may be combined with logic processor 702, volatile memory 703, and/or non-volatile storage device 704 in a shared enclosure, or such display devices may be peripheral display devices.

When included, input subsystem 708 may comprise or interface with one or more user-input devices such as a keyboard, mouse, touch screen, microphone, camera, or game controller.

When included, communication subsystem 800 may be configured to communicatively couple various computing devices described herein with each other, and with other devices. Communication subsystem 800 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

The following paragraphs provide additional support for the claims of the subject application. One aspect provides a computing device, comprising a processor, a primary power supply, and a voltage regulation module. The voltage regulation module may be configured to receive electrical power from the primary power supply, determine a load line for an electrical load of the processor, and monitor a voltage and a current to the processor via respective voltage and current sensing loops. While monitoring the voltage and current, the voltage regulation module may be further configured to regulate the voltage to the processor to trend toward a voltage setpoint defined by the load line for the monitored current. While regulating the voltage, the voltage regulation module may clamp the load line at a clamping voltage to limit the regulated voltage output by the voltage regulation module from falling below a predetermined device minimum operation voltage when the monitored current exceeds a device maximum current value, and output electrical power at the regulated voltage to the processor.

In this aspect, additionally or alternatively, the voltage regulation module may be programmed to set and/or change a value of the clamping voltage on the load line via a register command. In this aspect, additionally or alternatively, a value of the clamping voltage on the load line may equal to a constant voltage value at the device maximum current value. In this aspect, additionally or alternatively, a value of the clamping voltage on the load line may be equal to a value of the device minimum operation voltage. In this aspect, additionally or alternatively, the processor may include voltage identification logic configured to communicate a voltage identification to the voltage regulation module. The voltage regulation module may determine the maximum voltage setpoint based upon the voltage identification, and the maximum voltage value may be computed by substracting an offset from the voltage identification value or by machine learning. In this aspect, additionally or alternatively, to determine the load line, the voltage regulation module may set a value of a slope of the load line.

In this aspect, additionally or alternatively, the load line between a maximum voltage value at which there is no load and a minimum voltage value at the predetermined device minimum operation voltage may be defined as a linear load response. In this aspect, additionally or alternatively, the load line between a maximum voltage value at which there is no load and a minimum voltage value at the predetermined device minimum operation voltage may be defined as a nonlinear load response. In this aspect, additionally or alternatively, the computing device may be configured as a device selected from the group consisting of game console, personal computer, server, and portable electronic device. In this aspect, additionally or alternatively, the voltage regulation module may be configured to store one or more programmable values of the clamping voltage that correlate to one or more power states utilized by the device.

Another aspect provides a method for a computing device comprising a processor, a primary power supply, and a voltage regulation module. The method may comprise, at the voltage regulation module, receiving electrical power from the primary power supply, determining a load line for an electrical load of the processor, and monitoring a voltage and a current to the processor via respective voltage and current sensing loops. While monitoring the voltage and current, the method may further comprise, at the voltage regulation module, regulating the voltage to the processor to trend toward a voltage setpoint defined by the load line for the monitored current. While regulating the voltage, the method may further comprise, at the voltage regulation module, clamping the load line at a clamping voltage to limit the regulated voltage output by the voltage regulation module from falling below a predetermined device minimum operation voltage when the monitored current exceeds a device maximum current value, and outputting electrical power at the regulated voltage to the processor.

In this aspect, additionally or alternatively, the method may further comprise configuring the voltage regulation module to be programmable to set and/or change a value of the clamping voltage on the load line via a register command. In this aspect, additionally or alternatively, the method may further comprise configuring the voltage regulation module to set the value of the clamping voltage on the load line to be equal to a constant voltage value at a device maximum current value. In this aspect, additionally or alternatively, the method may further comprise configuring the voltage regulation module to set the value of the clamping voltage on the load line to be equal to the device minimum operation voltage. In this aspect, additionally or alternatively, the method may further comprise communicating a voltage identification from voltage identification logic of the processor to the voltage regulation module, determining, by the voltage regulation module, the maximum voltage setpoint based upon the voltage identification, and computing the maximum voltage value by substracting an offset from the voltage identification value or by machine learning. In this aspect, additionally or alternatively, the method may further comprise configuring the voltage regulation module to set a value of a slope of the load line.

In this aspect, additionally or alternatively, the method may further comprise defining the load line between a maximum voltage value at which there is no load and a minimum voltage value equal to the predetermined device minimum operation voltage as a linear load response. In this aspect, additionally or alternatively, the method may further comprise defining the load line between a maximum voltage value at which there is no load and a minimum voltage value equal to the predetermined device minimum operation voltage as a nonlinear load response. In this aspect, additionally or alternatively, the method may further comprise configuring the computing device as a device selected from the group consisting of game console, personal computer, server, and portable electronic device.

Another aspect provides a computing device comprising a processor, a primary power supply, and a voltage regulation module. The voltage regulation module may be configured to receive electrical power from the primary power supply, determine a load line for an electrical load of the processor, and monitor a voltage and a current to the processor via respective voltage and current sensing loops. While monitoring the voltage and current, the voltage regulation module may be further configured to regulate the voltage to the processor to trend toward a voltage setpoint defined by the load line for the monitored current. While regulating the voltage, the voltage regulation module may clamp the load line at a clamping voltage to limit the regulated voltage output by the voltage regulation module from falling below a predetermined device minimum operation voltage when the monitored current exceeds a device maximum current value, and output electrical power at the regulated voltage to the processor. The processor may include voltage identification logic configured to communicate a voltage identification to the voltage regulation module, and the voltage regulation module determines the maximum voltage setpoint based upon the voltage identification, and the load line between a maximum voltage value at which there is no load and a minimum voltage value at the predetermined device minimum operation voltage may be defined as a nonlinear load response.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device, comprising:
   a processor;
   a primary power supply; and
   a voltage regulation module configured to:
     receive electrical power from the primary power supply;
     determine a load line for an electrical load of the processor based on a load line definition stored at the voltage regulation module, the load line definition defining a voltage-current relationship of the load line, which includes a value of a clamping voltage for the load line;
     monitor a voltage and a current to the processor via respective voltage and current sensing loops;
     while monitoring the voltage and current, regulate the voltage to the processor to trend toward a voltage setpoint defined by the load line for the monitored current;
     while regulating the voltage, clamp the load line at the clamping voltage defined by the load line definition to limit the regulated voltage output by the voltage regulation module from falling below a predetermined device minimum operation voltage when the monitored current exceeds a device maximum current value; and
     output electrical power at the regulated voltage to the processor.

2. The computing device according to claim 1, wherein the voltage regulation module is programmed to set and/or change the value of the clamping voltage on the load line via a register command.

3. The computing device according to claim 1, wherein the value of the clamping voltage on the load line is equal to a constant voltage value at the device maximum current value.

4. The computing device according to claim 1, wherein the value of the clamping voltage on the load line is equal to a value of the device minimum operation voltage.

5. The computing device according to claim 1,
   wherein the processor includes voltage identification logic configured to communicate a voltage identification to the voltage regulation module, and the voltage regulation module determines the maximum voltage setpoint based upon the voltage identification; and
   wherein the maximum voltage value is computed by subtracting an offset from the voltage identification value or by machine learning.

6. The computing device according to claim 1, wherein to determine the load line, the voltage regulation module sets a value of a slope of the load line.

7. The computing device according to claim 1, wherein the load line between a maximum voltage value at which there is no load and a minimum voltage value at the predetermined device minimum operation voltage is defined as a linear load response.

8. The computing device according to claim 1, wherein the load line between a maximum voltage value at which there is no load and a minimum voltage value at the predetermined device minimum operation voltage is defined as a nonlinear load response.

9. The computing device according to claim 1, wherein the computing device is configured as a device selected from the group consisting of game console, personal computer, server, and portable electronic device.

10. The computing device according to claim 2, wherein the voltage regulation module is configured to store one or more programmable values of the clamping voltage that correlate to one or more power states utilized by the device.

11. A method for a computing device comprising a processor, a primary power supply, and a voltage regulation module, the method comprising:
   at the voltage regulation module:
     receiving electrical power from the primary power supply;
     determining a load line for an electrical load of the processor based on a load line definition stored at the voltage regulation module, the load line definition defining a voltage-current relationship of the load line, which includes a value of a clamping voltage for the load line;

monitoring a voltage and a current to the processor via respective voltage and current sensing loops;

while monitoring the voltage and current, regulating the voltage to the processor to trend toward a voltage setpoint defined by the load line for the monitored current;

while regulating the voltage, clamping the load line at the clamping voltage defined by the load line definition to limit the regulated voltage output by the voltage regulation module from falling below a predetermined device minimum operation voltage when the monitored current exceeds a device maximum current value; and outputting electrical power at the regulated voltage to the processor.

12. The method according to claim 11, the method further comprising:

configuring the voltage regulation module to be programmable to set and/or change the value of the clamping voltage on the load line via a register command.

13. The method according to claim 12, the method further comprising:

configuring the voltage regulation module to set the value of the clamping voltage on the load line to be equal to a constant voltage value at a device maximum current value.

14. The method according to claim 12, the method further comprising:

configuring the voltage regulation module to set the value of the clamping voltage on the load line to be equal to the device minimum operation voltage.

15. The method according to claim 11, the method further comprising:

communicating a voltage identification from voltage identification logic of the processor to the voltage regulation module, and determining, by the voltage regulation module, the maximum voltage setpoint based upon the voltage identification; and computing the maximum voltage value by sub subtracting an offset from the voltage identification value or by machine learning.

16. The method according to claim 11, the method further comprising:

configuring the voltage regulation module to set a value of a slope of the load line.

17. The method according to claim 11, the method further comprising:

defining the load line between a maximum voltage value at which there is no load and a minimum voltage value equal to the predetermined device minimum operation voltage as a linear load response.

18. The method according to claim 11, the method further comprising:

defining the load line between a maximum voltage value at which there is no load and a minimum voltage value equal to the predetermined device minimum operation voltage as a nonlinear load response.

19. The method according to claim 11, the method further comprising:

configuring the computing device as a device selected from the group consisting of game console, personal computer, server, and portable electronic device.

20. A computing device, comprising:

a processor;

a primary power supply; and a voltage regulation module configured to:

receive electrical power from the primary power supply;

determine a load line for an electrical load of the processor based on a load line definition stored at the voltage regulation module, the load line definition defining a voltage-current relationship of the load line, which includes a value of a clamping voltage for the load line;

monitor a voltage and a current to the processor via respective voltage and current sensing loops;

while monitoring the voltage and current, regulate the voltage to the processor to trend toward a voltage setpoint defined by the load line for the monitored current;

while regulating the voltage, clamp the load line at the clamping voltage defined by the load line definition to limit the regulated voltage output by the voltage regulation module from falling below a predetermined device minimum operation voltage when the monitored current exceeds a device maximum current value; and output electrical power at the regulated voltage to the processor;

wherein the processor includes voltage identification logic configured to communicate a voltage identification to the voltage regulation module, and the voltage regulation module determines the maximum voltage setpoint based upon the voltage identification; and wherein the load line between a maximum voltage value at which there is no load and a minimum voltage value at the predetermined device minimum operation voltage is defined as a nonlinear load response.

* * * * *